(12) United States Patent
Naik

(10) Patent No.: US 7,006,506 B1
(45) Date of Patent: Feb. 28, 2006

(54) AUTOMATIC DETECTION AND CONFIGURATION OF OSPF VIRTUAL LINKS

(75) Inventor: Tejas Naik, Eatontown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 723 days.

(21) Appl. No.: 09/664,565

(22) Filed: Sep. 18, 2000

(51) Int. Cl.
*H04L 12/28* (2006.01)
*H04L 12/66* (2006.01)

(52) U.S. Cl. .................. 370/397; 370/400; 370/395.1; 370/404; 370/352

(58) Field of Classification Search ................ 370/235, 370/352, 400, 401, 395.1, 391, 392, 396, 370/397, 398, 399, 395.2, 395.5, 218, 219, 370/225, 220, 217, 238, 409, 216, 338, 404; 209/238, 239, 224

See application file for complete search history.

(56) References Cited

U.S. PATENT DOCUMENTS

| | | | | |
|---|---|---|---|---|
| 5,699,347 | A | * | 12/1997 | Callon ........................ 370/238 |
| 5,854,899 | A | * | 12/1998 | Callon et al. .......... 395/200.68 |
| 6,173,324 | B1 | * | 1/2001 | D'Souza ..................... 709/224 |
| 6,229,787 | B1 | * | 5/2001 | Byrne ........................ 370/218 |
| 6,304,577 | B1 | * | 10/2001 | Nagami et al. ............. 370/409 |
| 6,363,072 | B1 | * | 3/2002 | Furuichi ..................... 370/395 |
| 6,473,421 | B1 | * | 10/2002 | Tappan ....................... 370/351 |
| 6,707,796 | B1 | * | 3/2004 | Li ............................... 370/254 |
| 6,856,602 | B1 | * | 2/2005 | Westberg .................... 370/254 |

OTHER PUBLICATIONS

Moy, J., Open Shortest Path First (OSPF) protocol, OSPF Version 2, Internet Standard, Apr. 1998.
Moy, J., "OSPF Anatomy of an Internet Routing Protocol", ISBN 0201634724, Addison-Wesley, 1998.
Zhang, Z., "Fixing Backbone Partition With Dynamic Virtual Links", Internet Draft, Nov. 1995.

* cited by examiner

*Primary Examiner*—Hanh Nguyen

(57) ABSTRACT

A network management system and technique, implemented in hardware and software, automates certain aspects of a network element configuration in a network of routers that use the OSPF protocol. The network management system uses network wide configuration information to detect configuration deficiencies and configuration related intra-element dependencies, and to then configure the elements automatically. This includes automatically detecting and configuring OSPF virtual links under several different scenarios, including (a) either minimal or complete (redundant) configuration of a router that is newly added to an existing network, and (b) reconfiguring of the routers in an existing OSPF domain, when either minimal or complete configuration is required. Minimal configuration is attained when at least one area border router (ABR) in an area is guaranteed to be connected to a backbone. In a complete configuration, all ABR's in an area are guaranteed to be connected to the backbone. System functionality includes determination of whether a router is an ABR, sequential analysis of routers (and their neighbors) to determine connection to a network backbone, and analysis of routers (and their neighbors) to determine if a virtual link to the backbone can be established. Advantageously, changes in the OSPF protocol are not required.

10 Claims, 5 Drawing Sheets

HIERARCHICAL ROUTING IN OSPF

HIERARCHICAL ROUTING IN OSPF

RECONFIGURATION OF VIRTUAL LINKS: MINIMAL CONFIGURATION.

RECONFIGURATION OF VIRTUAL LINKS: COMPLETE CONFIGURATION.

US 7,006,506 B1

AUTOMATIC DETECTION AND CONFIGURATION OF OSPF VIRTUAL LINKS

This invention relates generally to management of Internet Protocol (IP) networks running the Open Shortest Path First (OSPF) routing protocol, and more particularly, to automation of the configuration of routers in such networks when (a) routers are added to an existing network, and (b) when groups of routers must be configured for the first time.

BACKGROUND OF THE INVENTION

With the exponential growth of the Internet, Internet Protocol (IP) networks are growing at an amazing rate. Today's IP networks have complex network topologies, more protocols and variety of services. Managing IP networks has been harder than before, due to increased complexity in the configuration of the IP network elements. Configuration and maintenance of a large network needs several administrators. Communication among administrators is not always perfect. In large networks, it is very hard for administrators to keep track of existing configurations and to be consistent while reconfiguring networks.

Routers are critical network elements of IP networks, and the configuration of IP routers is a tedious and error prone task. The most important function of an IP router is to route data packets. A forwarding table inside a router is used to decide which route a packet should take to transit through the network. There are several ways to add entries to a forwarding table. Typically, a routing protocol builds this table dynamically. A "routing domain" is a collection of routers, and all routers in a routing domain run same routing protocol. One or more routing domains constitute an "autonomous system" (AS). A unique number, called the AS number, identifies each AS to the rest of the autonomous systems. Routing protocols designed to run among or between AS's are called "exterior gateway protocols" (EGP), while routing protocols designed to run inside an AS are called "interior gateway protocols (IGP). One of the most popular IGP is called the Open Shortest Path First (OSPF) protocol, and is described in "OSPF Version 2", J. Moy, Internet Standard, April 1998, and in "OSPF Anatomy of an Internet Routing Protocol", J. Moy, Addison-Wesley, 1998.

OSPF is a hierarchical routing protocol. It can run in an entire AS, which can be arbitrarily divided into OSPF "areas". A unique number identifies these areas. An area identified by number zero is also called the OSPF "backbone". A typical arrangement of a small portion of an autonomous system is illustrated in FIG. 1, which shows a group of interconnected routers R1 through R8 grouped into four areas designated Area 0 through Area 3. Area 0 is the backbone, since it contains transmission medium M. Areas 1 through 3 contain routers R1–R3, R4–R5, and R6–R8, respectively. Techniques for optimum grouping of routers in different areas is a network planning and design issue, which can be performed in a number of ways by persons skilled in the art.

In FIG. 1, a router is designated an "area border router" (ABR) if it is part of more than one area. Thus, routers R1, R4 and R6 are ABR's. Entries (i.e. routes) in a forwarding table are generally aggregated at the area level by the ABR'S, so that processing burden and storage requirements of the routers in the other areas are reduced. For OSPF to work correctly, at least one ABR in an area should be connected to the OSPF backbone M. This could be a physical or logical connection to a backbone. In FIG. 1, routers R1 and R4 are physically connected to backbone M. A logical connection is called a virtual link. When an administrator configures virtual link, (s)he makes an entry in configuration file of the routers on both ends specifying the router on the other end. In FIG. 1, router R6 has a virtual link VL to the backbone via router R4, the latter having a physical connection to backbone M.

A virtual link configuration can be handy in several cases. Two scenarios under which it is desirable to provide virtual links are as follows:

First, a virtual link is desirable to provide logical connectivity to a backbone when it is not feasible and/or justifiable to install a physical link. This might be the case when two separate networks are merging due to organizational merger. In FIG. 1, areas 1 and 2 could be a network owned by an organization A. Area 3 could be a network owned by another organization B. When organizations A and B merge, and thus desire to interconnect their previously separate networks, a virtual link VL could be used.

Second, a virtual link is also desirable to provide redundant backbone connectivity, such that at least two routers in an area are connected to the backbone. However, excessive redundancy is not desirable, either because it increases router load and network traffic. Persons skilled in the art have various methodologies available to determine an optimum number of virtual links for redundancy purposes.

An interesting phenomenon occurs when an administrator does not configure a virtual link between area 2 and area 3 in FIG. 1. Traffic between the routers in area 2 and area 3 (routers R4 through R8) can still flow, but the routers (R6 through R8) in area 3 will be disconnected from rest of the network. A virtual link between area 2 and are 3 gives full connectivity to routers R6–R8 in area 3. In all practical cases, full connectivity is desired.

In addition to the issue of creation of a virtual link when there is no physical connectivity between any router in an area and the backbone, another issue arises when it is desired to intentionally disable (for known reasons) the OSPF interface of a router. When this situation arises, the network administrator must take care to assure that undesired consequences do not occur. For example, disabling the OSPF interface on a particular router might disconnect one or more other OSPF areas, if virtual links are configured on that router, because disabling the OSPF interface disconnects all virtual links.

From above discussion, it can be seen that creation and management of virtual links in a network of routers using the OSPF protocol, is of vital importance. Traditionally, this task has been done manually, which often resulted in human errors due to oversight, lack of communication with peers, lack of network wide information and sometimes lack of knowledge.

One attempt to automate the process involving virtual links is described by Zhaohui Zhang, "Fixing Backbone Partition with Dynamic Virtual Links", Internet draft, November 1995. Zhang proposes modification of the OSPF protocol implementation to dynamically configure Dynamic Virtual Links (DVL) when the backbone is partitioned. In accordance with Zhang's DVL approach, a virtual link is created dynamically by the OSPF protocol itself, upon detection of backbone partitioning. He also proposes to delete DVL when they are not needed.

Zhang's proposal has not been implemented in practice, because it would be difficult to deploy the technique in existing networks. Existing routers in these networks do not support DVL; all vendors would need to modify their OSPF implementation to interoperate with each other, and this would be nearly impossible to achieve in the real world. Accordingly, at the present time, there is no automated system for the creation and management of virtual links in a network of routers using the OSPF protocol, that can be easily implemented and deployed in the existing networks without software or hardware upgrade.

SUMMARY OF THE INVENTION

In accordance with the present invention, a network management system and technique, implemented in hardware and software, is described that automates certain aspects of a network element configuration in a network of routers that use the OSPF protocol. The network management system uses network wide configuration information to detect configuration deficiencies and configuration related intra-element dependencies, and to then configure the elements automatically. This includes automatically detecting and configuring OSPF virtual links under several different scenarios.

In the case where a new router is being added to a network and minimal configuration is desired, the network management system analyzes the new router to determine if it is already connected to the network backbone. If not, then a virtual link is established through the new router. If a virtual link cannot be established through the new router then, an attempt is made to establish a virtual link through a neighbor of the new router. If complete configuration is desired, the process described above is performed so that virtual links are established from both the new router and its neighboring ABR. If the new router or its neighbor is not an ABR or they are already connected to backbone then virtual link is not established through that router.

In the case where it is desired to reconfigure the routers in an existing OSPF domain with at least minimal configuration, the network management system analyzes each area, in turn, to determine if it has at least one ABR connected to the network backbone. If at least one ABR is connected to the backbone, no further configuration is needed for that area. Otherwise, a virtual link is established for the area. If at least complete configuration is desired, the analysis is repeated for all ABRs in each of the areas.

The first scenario enables the OSPF on at least one of the interfaces of a router. A second scenario occurs while reconfiguring an existing OSPF domain. The term 'existing' is used to refer to the fact that no interface is being enabled/disabled from running the OSPF during reconfiguring process.

OSPF is disabled on interfaces in yet an additional scenario, which then operates in a manner similar to the second scenario.

Each scenario requires different techniques. Each scenario has two cases—one in which minimal configuration is done and the other in which complete configuration is done. In a minimal configuration, at least one router is guaranteed to be connected to a backbone. In a complete configuration all ABR are guaranteed to be connected to a backbone. For the first scenario, each case has two sub cases: (a) a first case where no interfaces are enabled for the OSPF on a router, and (b) a second case where at least one interface of a router is already enabled for the OSPF.

Advantageously, the present invention does not require any changes in the OSPF protocol. The technique can be implemented as application level software running on a host processor or computer.

BRIEF DESCRIPTION OF DRAWING

The present invention will be fully appreciated by consideration of the following Detailed Description, which should be read in light of the accompanying drawing in which:

FIG. 2 is a flow diagram of the process followed for enabling the OSPF on at least one of the interfaces of a router, assuming that no interfaces are already OSPF enabled, and minimal configuration is desired;

FIG. 3 is a flow diagram of the process followed for enabling the OSPF on at least one of the interfaces of a router, again assuming that no interfaces are OSPF enabled. In this process, complete configuration is desired;

FIG. 4 is a flow diagram of the process followed for reconfiguring an existing OSPF domain, where minimal configuration is desired; and FIG. 5 is a flow diagram, similar to FIG. 4, of the process followed for reconfiguring an existing OSPF domain when complete configuration is desired.

DETAILED DESCRIPTION

Figure 1:
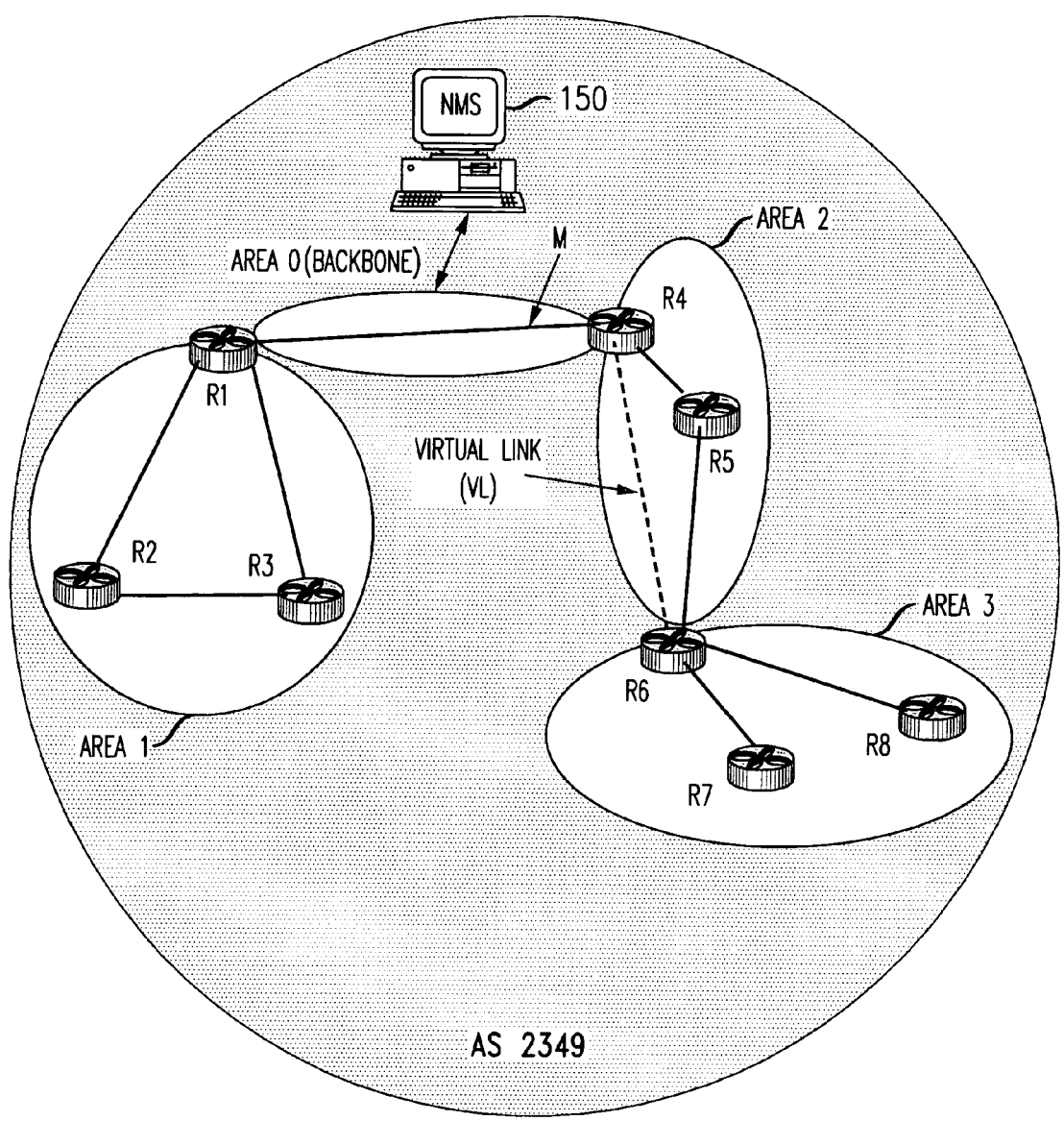
FIG. 1, previously described, illustrates the arrangement of a typical OSPF domain hierarchy, including multiple interconnected routers divided into several areas, and a backbone.
Figure 2:
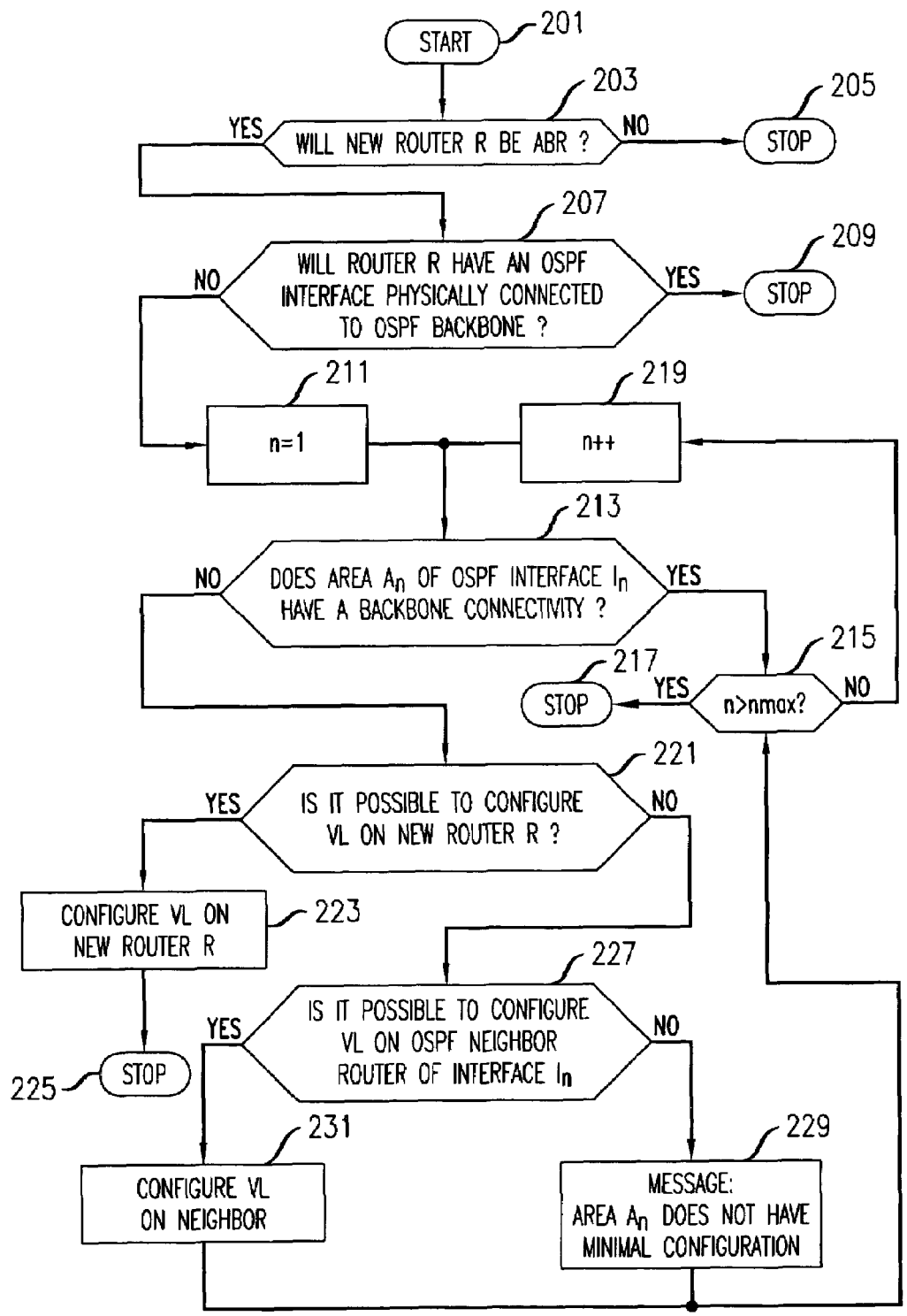
FIGS. 2–5 are flow diagrams of various processes followed in accordance with the present invention for automatic detection and automatic configuration of virtual links (VL); in particular.

Before describing the arrangement and processes of the present invention, which are carried out in the network management system (NMS) 150 of FIG. 1, several assumptions applicable to FIG. 2 must be described. First, it is assumed that the existing OSPF domain already has a minimal configuration, and no interface on a "new router R" (i.e., a router for which an interface is to be configured by the processes of the present invention) has an interface that is already enabled for OSPF. If the routers in other areas are not already configured, the process described below, in connection with FIG. 4, can first be performed. The case in which at least one interface of a router R is already configured is considered later in the description.

Second, it is assumed that a neighbor router is participating in at least one of the areas of an existing OSPF domain. This will ensure that a separate OSPF domain is not being created.

Third, it is assumed that all interfaces in an IP subnet belong to the same OSPF area. This assumption is satisfied by compliance with the OSPF protocol, and is therefore not a problem.

Notationally, $I_n$ represents the specific interface of a router R on which OSPF is being configured, where $n=1 \ldots n_{max}$, i.e., there are at most $n_{max}$ interfaces of router R on which OSPF is being configured. Each interface $I_n$ is configured for an OSPF area designated $A_n$. Whenever we use the phrase "enable OSPF on an interface $I_n$ for an area $A_n$", we implicitly mean that a neighbor interface is also being enabled for an area $A_n$, if it is not already enabled for the OSPF. Note here that router R can have multiple different interfaces to routers in the same OSPF area.

Referring now to FIG. 2, there is shown a flow diagram of the process followed for the automatic detection and automatic configuration of virtual links while enabling the OSPF on at least one of the interfaces of a router. This process attempts to achieve minimal configuration, i.e. it ensures that at least one ABR in an area is guaranteed to be connected to the OSPF backbone. This in turn ensures that each area will be connected to the rest of the areas in that OSPF domain.

The process begins in step 201 and proceeds to step 203, in which a determination is made as to whether the new router R will be an ABR. Recalling that the network management system of the present invention has access to network wide configuration information, the determination in step 203 can be made by determining if $A_1=A_2=\ldots=A_{nmax}$, i.e., whether or not all of the interfaces for the router R are to the same areas, in which case the router is not an ABR, or, conversely, whether or not any of the interfaces for the router R are to different areas, in which case the router is an ABR. If the router R is not an ABR, a NO result occurs in step 203. Since it is not necessary to configure virtual link on this router, the process then stops in step 205. Under these conditions, it is likewise not necessary to detect the necessity for a virtual link on a neighboring router to router R, again because area $A_n$ already will have a minimal configuration.

If a YES result is obtained in step 203, indicating that router R will be an ABR, a determination is next made in step 207 as to whether router R will have an OSPF interface physically connected to the OSPF backbone. If any one of the interfaces $I_n$ will be physically connected to the OSPF backbone, i.e. $A_n=0$, then there is no need to configure a virtual link, because the router R will have a physical link to the OSPF backbone. Accordingly, a YES result occurs in step 207, and the process stops in step 209.

If a NO result occurs in step 207, indicating that router R will not have an OSPF interface physically connected to the OSPF backbone, the value of the variable n is initialized at 1 in step 211 and the process proceeds to step 213, where a check is made for area $A_n$ of each interface $I_n$ for a backbone connectivity. If area $A_n$ already has backbone connectivity, a YES result occurs in step 213, and provided n=n+1 is determined not to be more than $n_{max}$ in step 215, the process increments the value of n in step 219 and the next interface is examined by repeating step 213. If all interfaces have already been examined, a YES result occurs in step 215, and the process stops in step 217.

If an area $A_n$ does not have a backbone connectivity, a NO result occurs in step 213, and a check is then made in step 221 to determine if it is possible to configure a virtual link on a router R. If that is the case, a YES result occurs in step 221, and a virtual link is then configured on router R in step 223, and the process stops in step 225. This gives connectivity to all the areas of router R, and no further configuration is needed. However, if it is not possible to configure a virtual link on a router R, a NO result occurs in step 221, and the process continues to step 227, where a check is made to determine if it is possible to configure a virtual link on the neighboring router attached to interface $I_n$. Here, the assumption is made that the neighbor interface of $I_n$ is either already configured for OSPF or configured for OSPF before $I_n$.

If it is possible to configure a virtual link on the neighboring router attached to interface $I_n$, a YES result occurs in step 227, and the neighbor is then configured for a virtual link in step 231. Otherwise, a NO result occurs in step 227, and an error message is generated in step 229 informing the administrator that an area $A_n$ will not be able to reach areas other than those directly attached. The process then returns to step 215 to determine if there are additional interfaces to analyze.

An optimization to above process is to check only unique areas that are being configured on the router R rather than going to each interface and checking an area of that interface. If at least one of the interfaces is already configured for OSPF on a router R, then the process of FIG. 2 is the same, except step 207 is changed to determine if either (a) the router has an OSPF interface already connected to the OSPF backbone, or (b) any of the new interfaces will be physically connected to the OSPF backbone. If the result of either of the determinations is affirmative, this means that the router R is already connected (physically or through a virtual link) to a backbone. In that event, there is no need for further configuration. If that is not the case, but any other new interface is being configured for an area 0, i.e. the OSPF backbone, then there is also no need for further configuration. In this situation, $n=n_{max}$ includes OSPF enabled interfaces.

Figure 3:
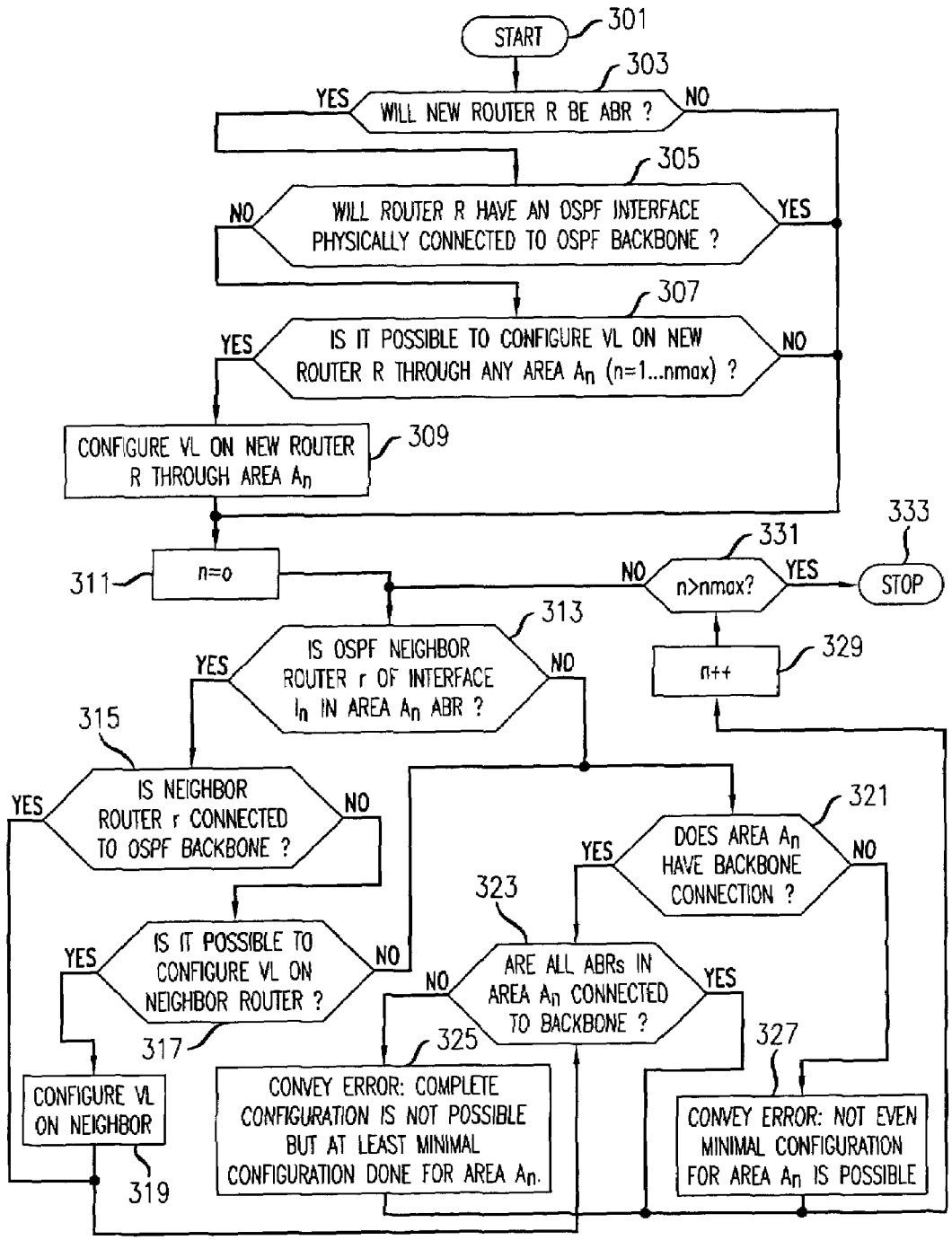

Referring now to FIG. 3, there is shown a flow diagram of the process followed for enabling the OSPF on at least one of the interfaces of a router, again assuming that no interfaces are OSPF enabled. In this process, complete configuration is desired, to ensure that each ABR in an area $A_n$ is guaranteed to be connected to the OSPF backbone. This ensures that an area $A_n$ will be connected to the rest of the areas in that OSPF domain and each ABR will be capable of routing traffic to any area. This does not mean that each router will route traffic to other areas. It just means that each router is capable of doing that. The routing will still be decided by the OSPF.

In the process of FIG. 3, it is again assumed that an interface $I_n$ is being configured for OSPF area $A_n$, and that the existing OSPF domain is already configured for complete configuration and no interface on a new router R has an interface $I_n$ that is already enabled for the OSPF. The process again proceeds to sequentially process the $n=n_{max}$ interfaces of the router R on which OSPF is being enabled, with the understanding that different interfaces can be in the same area. In the following description relating to FIG. 3, it is assumed that areas other than itself are already configured for complete configuration and no interface on a new router R has an interface $I_n$ that is already enabled for the OSPF. A solution for the restriction imposed by the first assumption is discussed below in connection with the process shown in FIG. 5. A solution for the restriction imposed by the second assumption is discussed later in explanation of the process shown in FIG. 3.

The process begins in step 301, and proceeds to step 303, where a determination is made as to whether or not the router R is an ABR. If $A_1=A_2=\ldots=A_{nmax}$, then the router R is not an ABR, and a NO result occurs in step 303, whereupon the process continues at step 311. In this even, it is not necessary to configure a virtual link on this router. However, this does not mean that an area $A_n$ has a complete configuration. It is necessary to check if virtual links are needed on a neighboring router, because of this new configuration. This is explained further below.

If a router R will be an ABR, and a YES result is obtained in step 303, a determination is next made in step 305 to determine if one of the interfaces $I_n$ will be in the OSPF backbone, i.e. $A_n=0$. In this event, a YES result is obtained in step 305 and the process again proceeds to step 311. Here again, there is no need to configure a virtual link on router R, because the router R will have a physical link attached to the OSPF backbone. (Note that again, it is still necessary to check if virtual links are needed on a neighbor).

If router R will not be an ABR, a NO result is obtained in step 305, and the process proceeds to step 307, in which it is determined if a virtual link can be created through any area $A_n$. If so, a YES result is obtained in step 307, and the virtual link is created on router R in step 309. If a NO result is obtained in step 307, it is then impossible to achieve a complete configuration for all areas that includes router R. This existence of this condition will be conveyed to the system administrator later in the process. Either way, the process proceeds to step 311 and beyond, in order to determine if all areas (which includes router R) have complete configuration.

In step 311, the value of n is initialized such that n=0, and the process proceeds to step 313, in which interface $I_n$ (that is being OSPF enabled) can be checked to determine if a neighbor router r is an ABR. If a NO result in achieved in step 313, the process proceeds to step 321, where a determination is made as to whether area $A_n$ has a backbone connectivity. If a NO result occurs in step 321, then an error message is generated in step 327, indicating that "Not even a minimal configuration is possible for an area $A_n$". This means that area $A_n$ may not reach several other areas in an OSPF domain.

If area $A_n$ has a backbone connectivity, a YES result occurs in step 321, and a determination is then made in step 323 as to whether all ABRs in area $A_n$ are connected to a backbone. If a NO result occurs in step 323, an error message is generated in step 325 indicating that "Complete configuration is not possible for area $A_n$ but at least minimal configuration is done". This means that area $A_n$ will be able to connect to all other areas, but not that all ABR are capable of connecting to all other areas.

After steps 325 or 327 are completed, or if a YES result occurs in step 323, the process proceeds to step 329, in which the value of n is incremented, and a determination is made in step 331 as to whether all interfaces have been examined. If so, a YES result occurs in step 331, and the process stops at step 333. If other interfaces need to be examined, a NO result occurs in step 331, and the process repeats by returning to step 313.

If it is determined in step 313 that a neighbor router r is an ABR, a YES result occurs in step 313, and the process proceeds to step 315, in which a determination is made as to whether the neighbor router r is connected to a backbone. If a NO result occurs in step 315, the process proceeds to step 317, in order to then try to configure a virtual link on r if possible. If a YES result occurs in step 317, a virtual link is configured on the neighboring router r in step 319, and the process proceed to step 323.

If a NO result occurs in step 317, indicating that it is not possible to configure a virtual link, the process proceeds to step 321 in order to detect the type of configuration area $A_n$ has. In this case an area $A_n$ will not have complete configuration.

If a virtual link is configured on a neighbor r (in step 319) or if r is already connected to a backbone (YES result in step 315), then area $A_n$ will at least have a minimal configuration In this case, the process continues in step 323, to determine whether $A_n$ has a complete configuration. While detecting the configuration type of an area, the interfaces that are not yet traversed and the neighbors of those interfaces are not considered.

If at least one interface is already configured on a router R, then the process just described is same, except that step 305 is changed to determine the existence of two possible conditions: (a) does router R have an OSPF interface already connected to OSPF backbone, or (b) will any new interfaces be physically connected to OSPF backbone? This means that if a router is already connected (physically or through a virtual link) to a backbone, then there is no need for further configuration on a router R. If that is not the case, but any new interface is being configured for an area 0 (i.e. the OSPF backbone) then there is no need for further configuration on router R. In this situation, n=$n_{max}$ includes OSPF enabled interfaces.

Figure 4:
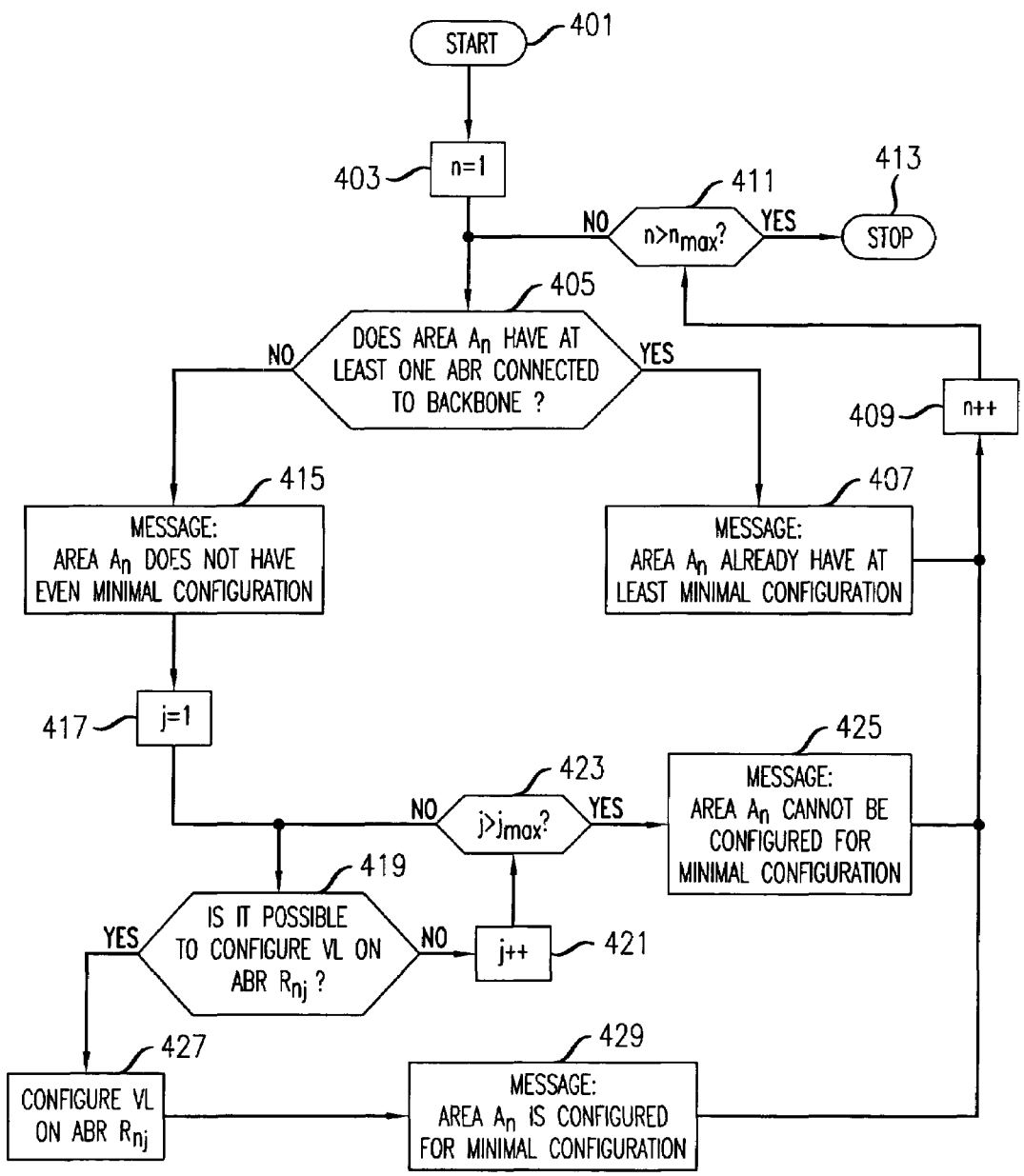

Referring now to FIG. 4, there is shown a flow diagram of the process followed for reconfiguring an existing OSPF domain, where at least minimal configuration is desired. In this process, all possible attempts are made to achieve at least minimal configuration. The process sequentially analyzes each area except the backbone area, automatically detects the necessity of virtual links in all the areas, and automatically configures the corresponding ABR to create those virtual links. The areas may have more virtual links then needed by a minimal configuration, and, indeed, certain areas may have even complete configuration. The objective of this process is to guarantee at least minimal configuration. If this process cannot be successfully completed, a physical change in topology is needed to achieve minimal configuration.

The process begins in step 401 and proceeds to step 403, in which a variable n is initialized at n=1. Here, it is assumed that there are n=$n_{max}$ non-backbone areas in an OSPF domain, and each area $A_n$ has j ABR. The maximum value of j is $j_{max}$ for area $A_n$. The next process proceeds to step 405, in which a determination is made, as to whether area $A_n$ has at least one ABR connected to the network backbone. If so, minimal connectivity is present, a YES result occurs in step 405, and a message indicating the existence of at least minimal configuration is generated in step 407. The value of n is then incremented in step 409, and if there are additional areas to examine, the process returns to and repeats step 405 for the next area $A_n$. If all areas have been checked, a YES result is returned in step 411, and the process stops at step 413.

If a NO result occurs in step 405, indicating that area $A_n$ does not have an ABR with backbone connectivity, a message to that effect is generated in step 415. The process then proceeds to step 417 and beyond, in an attempt to configure a virtual link on any ABR $R_{nj}$. Specifically, in step 417, the value of j is initialized at j=1, and the process proceeds to step 419, to see if a virtual link can be configured for this ABR. If a YES result occurs in step 419, the configuration occurs in step 427, a message indicating the at least minimal configuration is generated in step 429, and the process repeats (steps 409, 411 and 405) if there are more areas to analyze. If a NO result occurs in step 419, the process is repeated for additional ABR's by incrementing j in step 421 and repeating step 419 if step 423 determines that not all ABR's in area $A_n$ have been analyzed. If all ABR's have been analyzed, a YES result occurs in step 423, whereupon a message is generated in step 425 indicating that area $A_n$ cannot achieve even minimal configuration.

Figure 5:
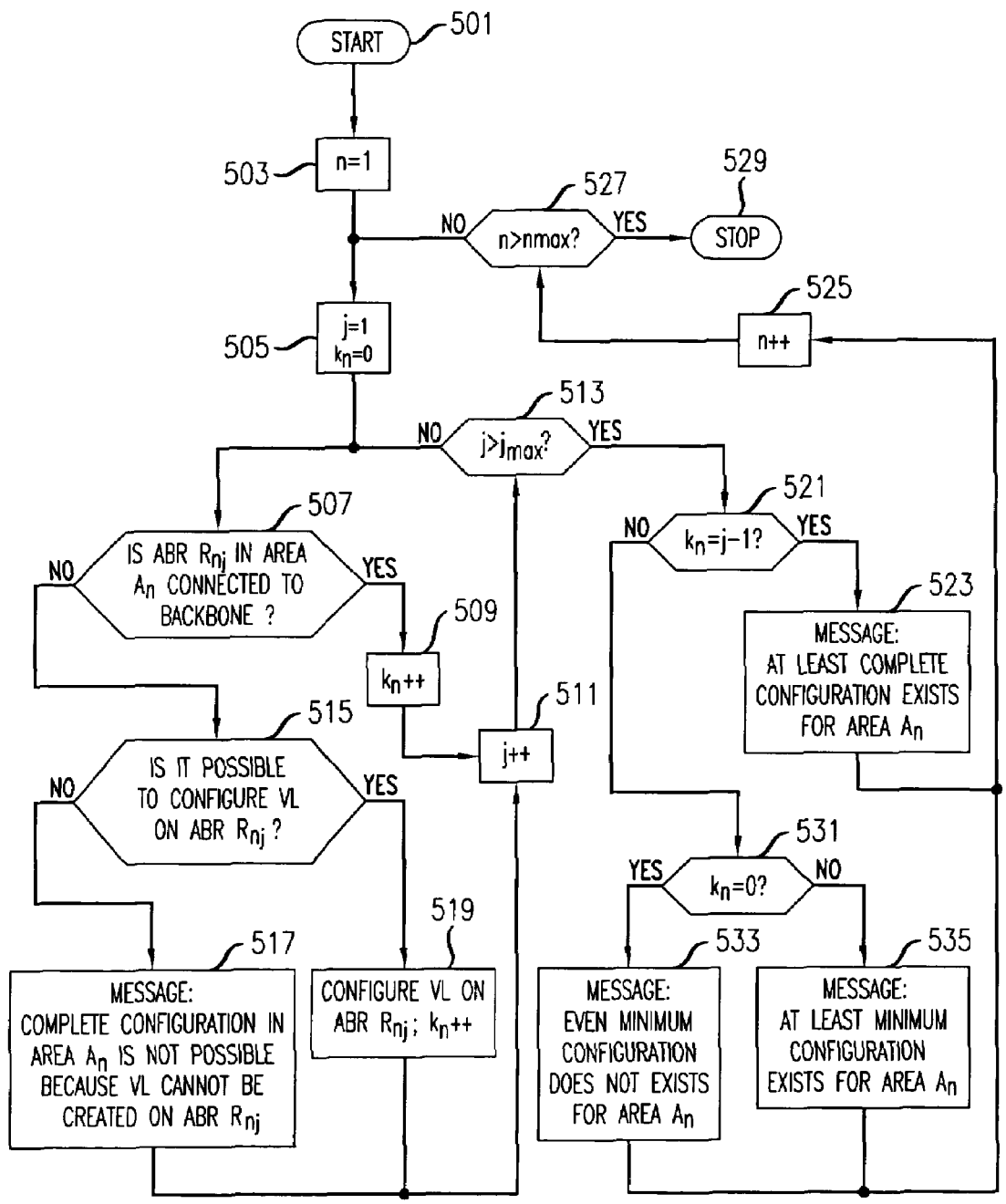

FIG. 5 is a flow diagram, similar to FIG. 4, of the process followed for reconfiguring an existing OSPF domain when complete configuration is desired. While this process is similar to the process of FIG. 4 just described, here all possible attempts are made to achieve at least complete configuration. Note that with complete configuration, areas may have more virtual links than needed. If this process fails, then a physical change in topology is needed to achieve complete configuration. As before, the process of FIG. 5 assumes that are n (up to $n_{max}$) non-backbone areas in an OSPF domain, and that each area $A_n$ has j=$j_{max}$ ABR. $k_n$ represents the number of ABR in an area $A_n$ that have backbone connection. The process automatically detects the necessity of the virtual links in all areas, and automatically configures corresponding ABR to create those virtual links. The process is performed sequentially on each area except on a backbone area.

The process begins in step 501, and the variables n, j and $k_n$ are initialized in steps 503 and 505. In step 507, each ABR $R_{jn}$ in area $A_n$ is checked to determine if it is connected to a backbone. If a YES result occurs for the present ABR in step 507, the values of j and $k_n$ are incremented in steps 509 and 511, and if all ABR's have not been checked (as determined by step 513) step 507 is repeated for the next ABR. If a NO result occurs in step 507, a determination is made in step 515 as the whether a virtual link can be configured on that ABR. If so, a YES result occurs in step 515, and the VL is configured in step 519. The process proceeds to step 511, in which j is incremented and the next ABR is configured. If a NO result occurs in step 515, a message is generated in step 517 indicating that "Complete configuration in area $A_n$ is not possible because virtual link cannot be created on ABR $R_{nj}$. The process again proceeds to step 511.

After all ABR are processed, a YES result occurs in step 513. Then, the process proceeds to step 521, which evaluates the values of system variables. If it is determined in step 521 that $k_n==j-1$, this indicates that all ABR in area $A_n$ have a backbone connection. If that is the case, then a message is generated in step 523 indicating that "Complete configuration exists for area $A_n$". Otherwise a determination is made in step 531 as to whether at least one of the ABR in area $A_n$ has a virtual link (i.e., is $k_n>0$). If so, a message is generated in step 535 indicating that "At least minimal configuration exists for area $A_n$". Otherwise, the process proceeds to step 533, in which a message is generated indicating that "Even minimal configuration does not exists for area $A_n$".

Persons skilled in the art will recognize that various adaptations and modifications may be made to the present invention. Accordingly, the scope of the invention is to be limited only by the appended claims. For example, it is possible that the OSPF protocol is disabled on some of the interfaces of a router. This might lead to configuration inconsistencies, since disabling the OSPF protocol on the only interface connected to a backbone might disconnect a particular area. A solution to this situation is to arrange the network management system to automatically perform either the process of FIG. 4 or the process of FIG. 5, depending on the situation.

What is claimed is:

1. A method for configuring a router in a communication network using an Open Shortest Path First (OSPF) protocol, comprising:
   (a) determining that the router is not physically or virtually connected to a backbone area of the network or an area border router (ABR) of the network;
   (b) establishing at least one physical link from the router to at least one non-ABR or at least one ABR of the network;
   (c) establishing a virtual link from the router to a backbone router in the backbone area through the at least one non-ABR and at least one ABR of an area associated with the at least one non-ABR when, at the step (b), said physical link is established to the at least one non-ABR; and
   (d) establishing a virtual link from the router to a backbone router in the backbone area through the at least one ABR when, at the step (b), the physical link is established to the at least one ABR.

2. The method of claim 1 wherein at least one of the steps (a), (c), and (d) further comprises:
   using a network management system (NMS).

3. The method of claim 1 wherein the step (b) further comprises:
   establishing the physical links having minimal network latencies.

4. The method of claim 1 wherein the step (c) further comprises:
   establishing the virtual link from the at least one ABR to the backbone.

5. The method of claim 1 wherein the step (d) further comprises:
   establishing the virtual link from the at least one ABR to the backbone.

6. A method for configuring a communication network using an Open Shortest Path First (OSPF) protocol, comprising:
   grouping routers of the network to form at least one routing domain, each routing domain including a plurality of neighboring routers;
   forming in each muting domain at least one area border router (ABR) having at least one physical link to at least one of a backbone area of the network and a router of other routing domain of the network; and
   configuring the routers using the steps of:
   (a) determining that a router is not physically or virtually connected to the backbone area of the network or the ABR of the network;
   (b) establishing at least one physical link from the router to at least one non-ABR or at least one ABR of the network;
   (c) establishing a virtual link from the router to a backbone router in the backbone area through the at least one non-ABR and at least one ABR of an area associated with the at least one non-ABR when, at the step (b), the physical link is established to the at least one non-ABR; and
   (d) establishing a virtual link from the router to a backbone router in the backbone area through the at least one ABR when, at the step (b), the physical link is established to the at least one ABR.

7. The method of claim 6 wherein at least one of the steps (a), (c), and (d) further comprises:
   using a network management system (NMS).

8. The method of claim 6 wherein the step (b) further comprises:
   establishing the physical links having minimal network latencies.

9. The method of claim 6 wherein the step (c) further comprises:
   establishing the virtual link from the at least one ABR to the backbone.

10. The method of claim 6 wherein the step (d) further comprises:
    establishing the virtual link from the at least one ABR to the backbone.

* * * * *